United States Patent [19]
Birch

[11] 4,094,099
[45] June 13, 1978

[54] SCREEN DOOR ASSEMBLY

[76] Inventor: Alexander A. Birch, 915 Phillips Ave., Clawson, Mich. 48017

[21] Appl. No.: 759,325

[22] Filed: Jan. 14, 1977

[51] Int. Cl.² .............................................. E06B 9/00
[52] U.S. Cl. ........................................ 49/163; 49/62; 49/65; 160/96
[58] Field of Search ................. 49/61, 63, 65, 67, 163, 49/168, 503, 62; 160/96, 180

[56] References Cited

U.S. PATENT DOCUMENTS

| | | | |
|---|---|---|---|
| 2,537,896 | 1/1951 | Hinton et al. | 49/65 X |
| 3,243,928 | 4/1966 | Hare | 49/63 X |
| 3,288,200 | 11/1966 | Gagne | 160/180 |
| 3,832,805 | 9/1974 | Stevens | 49/67 X |

*Primary Examiner*—Kenneth Downey
*Attorney, Agent, or Firm*—Dale Austin Winnie

[57] ABSTRACT

A screen door hinged for cooperation with and actuation separate from an outer closure door, and comprising; a peripheral frame including a full length hinge supported side rail, a second laterally spaced and relatively parallel side rail having an interruption between its ends, and cross rails connecting the outer and inner ends of said second side rail to said first mentioned side rail for providing relatively separate upper and lower screen receptive sections; and a member bridging the interruption in said second side rail and offset inwardly between the inner ends thereof for providing, with other spacer and channel grooved members, a recessed and reinforced center section for accomodating the handle and latch mechanism of the outer door member and making them more accessible when used in close association with an outer door closure member.

4 Claims, 7 Drawing Figures

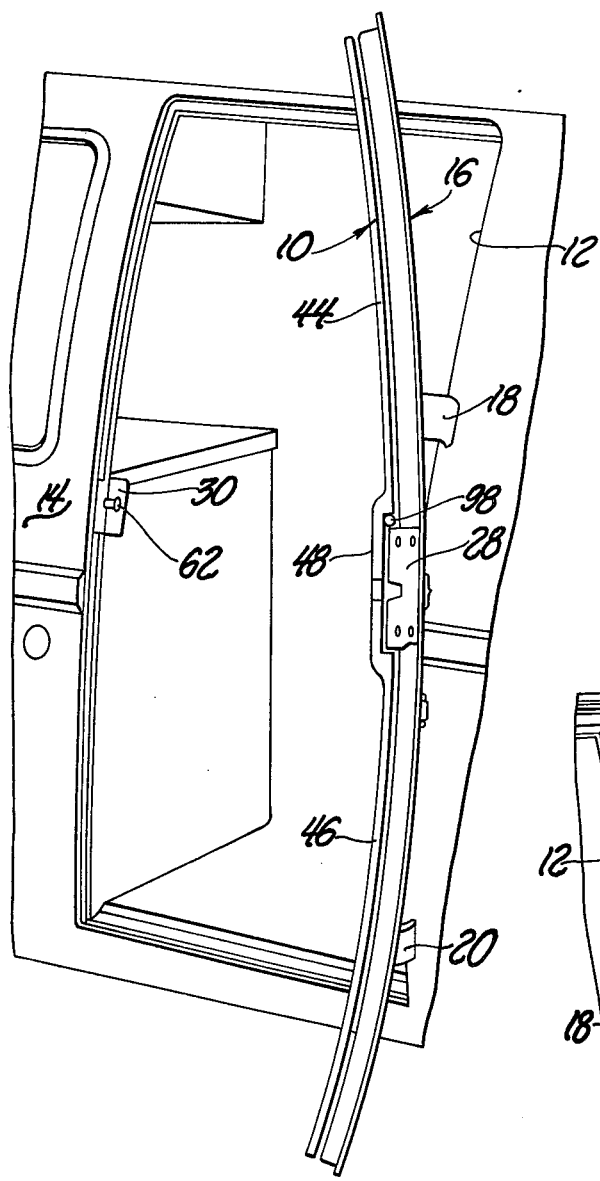

SCREEN DOOR ASSEMBLY

BACKGROUND OF THE INVENTION

Storm and screen door closures are normally hung in a doorway to swing inwardly or outwardly in a direction opposite to that of the main door. However, there are some situations in which it is not possible for the secondary door to swing in an opposite direction and where it is necessary or desirable to have it hinged to swing in the same direction as the main door, if possible.

One such situation is with the door arrangement in campers and mobile home units where there is an entranceway and step inside the vehicle which prevents a door from being able to swing inwardly more than a few inches, if at all. And, even where there is room and opportunity for the door to swing inwardly, it would be a great inconvenience because of the already limited space available in such travel units.

Although the regular camper or mobile home closure door can be removed and replaced with a screen door, while at camping sites, and shades or curtains can be used for privacy and weather protection, this is not too acceptable from a security standpoint, and it is a considerable inconvenience to have to store and change from one door to the other again and again.

Some campers and mobile home units have a window in the door which can be opened and they have a screen that can be used with the window opening in the door. This, however, is not the same nor does it serve as well, as a full screen covered opening, and particularly one which reaches clear to the floor.

The advantage of the full length screen door opening when it is able to be used is that it allows much better and more effective air circulation within a camper or mobile home unit. This is because it provides about the only floor level opening which can be used with the regular screened window openings for a convection flow through the living spaces. And, when used, the difference is quite noticable and most appreciated.

While it would seem that the answer would be to have readily changeable screen inserts for plain or window panels in the regular closure door, this has not been done. And the reasons are many but obviously include the weather sealing problems, since campers and mobile units are for winter as well as summer use, and security reasons, as have already been mentioned.

The several problems that arise in trying to have a screen door that will swing in the same direction as the main door include hinging the two to the same door frame, or otherwise, being able to open and close the outer door through the inner one, and, if possible, to avoid interference between the two doors and instead try to provide some means of cooperative movement therebetween, as needed, and independently, where otherwise desired.

It is with these goals in mind that the present invention was devised.

SUMMARY OF THE PRESENT INVENTION

The present invention relates to a screen door closure for a mobile home unit and one which is adaptable and servicable for use with campers and in other instances where a screen door, or storm door, is required to open and swing with a regular door closure in the same given direction.

The particular door arrangement hereof includes a screen door member which is hinged with the regular door closure, on cooperative hinges, to open with or seperately from the regular door closure. It is provided inside of the regular closure door and it has screen covered openings in both the upper and lower portions thereof which are as large as space permits.

Aluminum framing, of the type used for regular household storm and screen windows and doors, is used with interconnecting cross and support members that are heli-arc welded or pop-riveted in place.

While the one side of the screen door, the one which is hinged, includes a full length piece, the other side edge is interrupted by an offset piece to allow for the somewhat inwardly disposed and projecting latch and handle means of the regular closure door. And, to strengthen the screen door at this mid-section area an inner box frame is built and provided, with the added purpose of receiving and accomodating several sliding panel closures.

The particular door arrangement hereinafter shown and described is for a General Motors motor home, which requires a body formed curvature from top to bottom. However, its novelty lies more in its construction which is relatively simple to manufacture, once it is known how, and in its hinge arrangement which allows it to be mounted with the standard closure door, on the same hinge pins, except slightly longer, for opening and closing activation with and attached to the regular door, as well as seperate and apart therefrom, without interference, when and as desired.

DESCRIPTION OF THE DRAWING FIGURES:

FIG. 1 is a side perspective view of a motor home showing the doorway and the door open and with the screen door of the present invention as seen from the outer side edge and open with the regular door.

FIG. 2 is a similar side perspective of a motor home doorway and side wall, with the regular door and the screen door both shown as fully open.

DETAILED DESCRIPTION OF THE ILLUSTRATED EMBODIMENT

Figure 3:
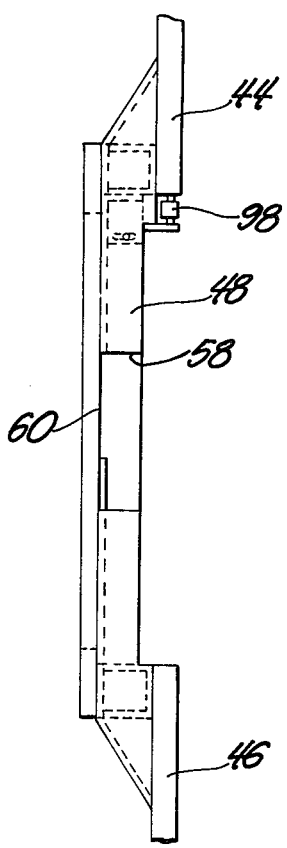
FIG. 3 is an enlarged detail of the offset portion of the outer side edge of the screen door.

The screen door 10 of the present invention is shown in the first two drawing figures as mounted in the doorway 12 of a motor home vehicle 14 for use inside of a regular outer door 16. The first drawing figure shows the outer edges of the screen door and the regular door, while the second drawing figure shows the inside of the screen door, as opened fully out against the side wall of the motor home body, and with the inside of the regular door visible through it.

The outer regular door 16 is supported on hinges 18 and 20 which have one leaf of the hinge fastened into the vehicle body wall and the other connected to the door at upper and lower locations and in relatively conventional manner, as shown; except as will be later described and is a consequence of the particular motor home shown.

The screen door 10 is in turn hinged to the outer door hinges, as by hinge leafs 22 and 24, at the upper and lower positions respectively, as best seen in the second drawing figure and will be more fully described with reference to figure 7 later on.

The outer door 16 is shown to have a lip 26 which makes is extend wider and taller than the screen door 10 and will be appreciated as providing for the weather tight seal and closure of the door in the doorway 12, without interference with the screen door. The latch mechanism 28 for the outer door, as shown in the first drawing figure, extends inwardly and would interfer with the close fit of the screen door next thereto, if it were not anticipated and planned for.

Although not shown in detail, it can be seen and appreciated that the door handle and latch mechanism, in this particular instance, is of the automotive type. The latch mechanism 28 is carried by the door and cooperates with the striker plate assembly 30 that is mounted in the doorway opening. And, from the inside view, of FIG. 2, the outer door can be seen to have a center panel 32 on which is mounted a pull strap 34 and within which is recessed the inner door handle 36.

The door lock button 38, which is of the automotive push-pull type, can also be seen in FIG. 2, on the upper edge of the center panel 32, at the lower outer corner of the window 40 in the door.

Referring now to the construction of the screen door 10:

It includes a full length, inner, hinged side rail 42, which extends from the top to the bottom of the screen door, and upper and lower outer side rail parts 44 and 46, which form the other and outer opening edge of the screen door with an interruption therebetween. This outer edge, with the interruption between the parts 44, 46 also includes a bridging member 48 which is set inwardly and spans the interruption between the inner ends of frame rail parts 44, 46; as best seen in FIG. 3.

The frame rail parts 42, 44 and 46 are of aluminum and of the usual square sectioned hollow or tubular form generally known for screen windows and doors. They also have like cross members 50 between their top and bottom ends, although the latter, at the bottom, is obscured in FIG. 2 by the kick plate 52 that is fastened thereover. And, similar cross members 54 and 56 are provided at the mid-section area which fasten the inner ends of rail members 44, 46 and join them to the opposite full length side rail 42.

The bridging member 48 is a structural reinforcement member, channel sectioned and open outwardly, fastened to the inside ends of the rail members 44, 46, and notched in its side, as at 58, as well as its back wall, as at 60, to accomodate the striker plate stud 62 that projects and for cooperation with the latch mechanism carried by the outer door 16.

Figure 4:
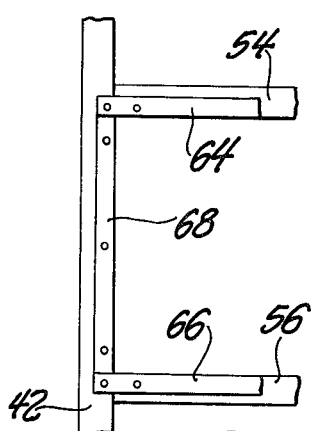
FIG. 4 is a back side plan view of the hinged edge of the screen door showing just the part thereof near the box-sectioned center area, without the closure panels.
Figure 5:
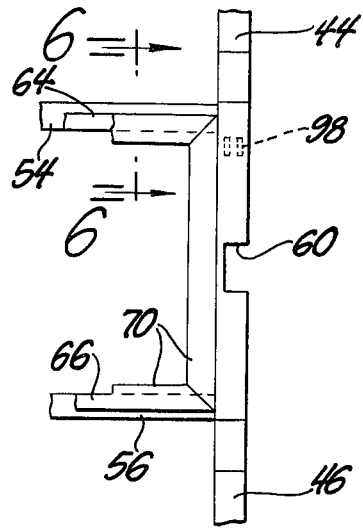
FIG. 5 is a back side plan view of the other edge of the screen door, similar to FIG. 4, and just across therefrom.

Referring now to FIGS. 4 and 5, it will be seen and appreciated that behind the cross rails 54 and 56, and between the outer side rails 42 and 44, 46, there are reinforcement and spacer member 64 and 66, respectively. Also, that a similar square sectioned tubular member 68 also extends and is fastened down the back side of the side rail 42 between the ends of the reinforcing spacer member 64, 66.

The latter, the reinforcing spacer member 68, has a general cross-sectional depth comparable to that of the bridging member 48 and so the two, together with the cross members 64, 66, provide the recessed depth necessary to accomodate the inside door handle 36 and pull strap 34 on the outer door 16, when in close consort with the outer door.

Figure 6:
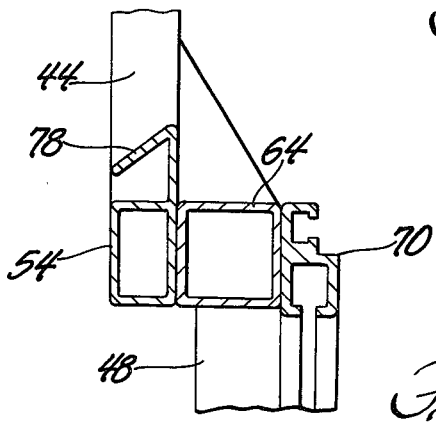
FIG. 6 is an enlarged cross-sectional view of the structural members of the screen door as seen in the plane of line 6—6 in FIG. 5 and looking in the direction of the arrows.

In order to dress-up the inside of the screen door 10, and close the recessed mid-section just mentioned, channel grooved members 70, as shown in FIG. 6, are used to frame the opening and to accomodate three sectional sliding panels 72, which are shown as open and stacked together in FIG. 2.

In passing, and while referring to FIG. 6, it will be noted and is to be understood that each of the side and cross rail frame members 42, 44, 46, 50, 54 and 56, which frame the two screen openings 74 and 76 in the screen door, are generally of the cross-sectioned shape shown for cross rail 54 in FIG. 6, with the down turned inner edge 78 as is conventionally known and used to receive the edge of the screen and the rubber or rope-like grommet retainer means used to keep the screen edge entrapped therewithin.

Figure 7:
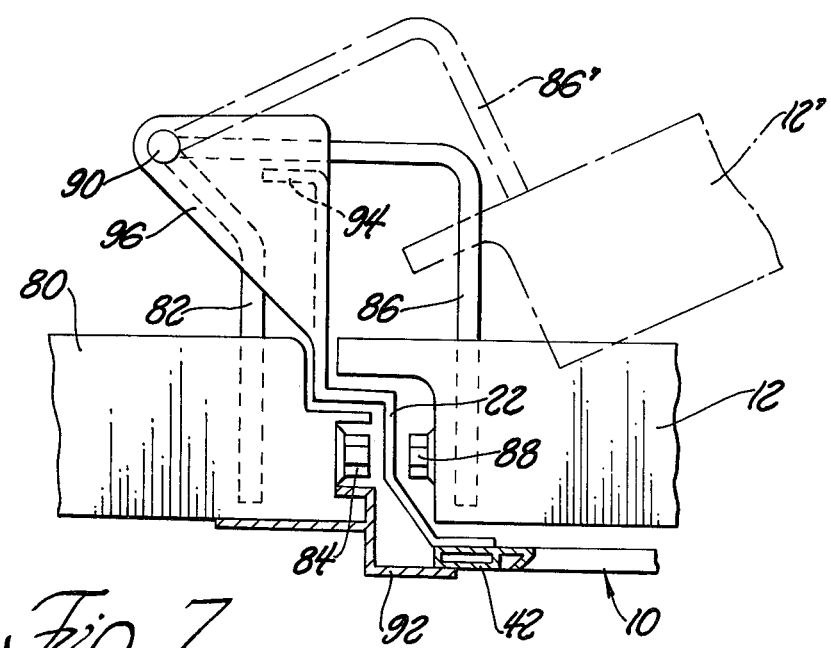
FIG. 7 is an enlarged cross-sectional and fragmentary view of the body, door, doorway and screen door, showing their hinged and interrelated connections as closed, and with the outer door also shown as partially open in phantom outline.

Referring now to FIG. 7, which shows the hinging arrangement for the outer door 12 and the inner hung screen door 10; the vehicle body wall 80 is shown with the fixed leaf 82 of one of the hinge means 18, 20 fastened thereto, as by bolt fastener 84 (although not detailed in the drawing figure) and the other leaf 86 of the hinge means is shown fastened into the door, as by bolt fastener 88. The phantom line position shown for the door 12' with its hinge leaf 86', emphasises the door opening action on the hinge pin 90 and better shows how the screen door 10 is disposed and will remain in a closing position in the doorway against the stop molding 92 that is provided therearound.

As can be seen, the full length screen door side rail 42 has its own hinge leaf 22 fastened to it and has the hinge leaf formed to pass between the body wall 80 and outer door 12 within the weather sealing space normally provided. It is formed to include a stop 94 with which the outer door hinge leaf 86 will come in contact, when being closed, if the screen door is opened, to close the screen door with it. And, it includes an over lying flap or ear 96, which is formed and disposed for engagement with both opposite ends of the hinge pin 90 to which it is engaged.

Although not previously mentioned, and a relatively minor part of the overall assembly, a simple roller-type cabnet catch, as at 98, is and may be used on the screen door to hold and engage it to the outer door 12 when the two are normally to be opened and closed together.

The screen door disclosed is new and different in its particular construction, being formed with one side rail interrupted and with a strengthening mid-section relatively offset to accomodate the handle and latching mechanism of a regular door which allows it to lie closer to the outer door. And, has hinge arrangement which allows it to swing with an outer door in a cooperative manner or seperately, as desired. The construction is relatively simple, making it less expensive to manufacture, easy to assemble and otherwise produce. At the same time it is light in weight, sturdy, and otherwise easy to handle and to install and/or remove, when and as desired.

I claim:

1. A screen door hinged for cooperation with and activation seperate from another closure door, said screen door comprising;

a peripheral frame including a full length hinge supported side rail, a second laterally spaced and relatively parallel side rail having an interruption between its ends, and cross rails connecting the outer and inner ends of said second side rail to said first mentioned side rail for providing relatively seperate upper and lower screen receptive sections, a member for bridging the interruption in said second side rail received and offset inwardly between the inner ends of said second side rail, a like inwardly offset member provided on said full length hinge supported side rail, and a pair of structural reinforcement members provided on said inner disposed cross rails and between the ends of said offset members for boxing the opening provided between said two screen receptive portions and structurally reinforcing said screen door at the mid-section thereof.

2. The screen door of claim 1, said structural reinforcement members and said inwardly offset members in combination also providing a spacer frame on the inner side of said screen door, and channel grooved members secured to said spacer frame and open inwardly to provide a trackway for receiving and retaining sliding panel door closures therewithin.

3. The screen door of claim 2.

said upper and lower screen receptive sections being adapted to lie in close nested relation to the outer closure door and having spring catch and release means for holding the two doors for actuation together when and as desired.

and said spacer frame members being relatively disposed and having sufficient depth for receiving the outer door opening and closing hardware therewithin and behind said sliding panel closures as used therewith.

4. The screen door of claim 3, said bridging member being of sufficient width to allow for, and having, a notch provided through the outer side edge thereof sufficient to accomodate the latch member on the door frame which is disposed to cooperate with the latching mechanism provided on the outer door member.

* * * * *